(12) United States Patent
Coon et al.

(10) Patent No.: US 6,367,145 B1
(45) Date of Patent: Apr. 9, 2002

(54) METHOD OF MAKING A SUSPENSION FLEXURE WITH LOAD-UNLOAD EFFICIENT MOTION LIMITING FEATURE

(75) Inventors: Warren Coon; Amanullah Khan; Gustavo Nuno; David Wolf, all of Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 0 days.

(21) Appl. No.: 09/684,261

(22) Filed: Oct. 6, 2000

Related U.S. Application Data

(62) Division of application No. 09/274,755, filed on Mar. 23, 1999, now Pat. No. 6,137,657.
(60) Provisional application No. 60/079,300, filed on Mar. 25, 1998.

(51) Int. Cl.$^7$ .................................................. G11B 5/42
(52) U.S. Cl. .................................. 29/603.03; 360/245.7
(58) Field of Search .......................... 29/603.03, 603.01; 360/245.7

(56) References Cited

U.S. PATENT DOCUMENTS 5,333,085 A * 7/1994 Prentice et al. .......... 360/245.7

* cited by examiner

Primary Examiner—Carl E. Hall
(74) Attorney, Agent, or Firm—Louis J. Bachand

(57) ABSTRACT

A disk drive suspension assembly of a flexure and a flexure support, the flexure having a tongue adapted to carry in gimbaling relation a slider in operating proximity to a disk, the flexure support and the flexure tongue defining cooperating structures which limit motion of the tongue relative to the disk to a predetermined range.

1 Claim, 3 Drawing Sheets

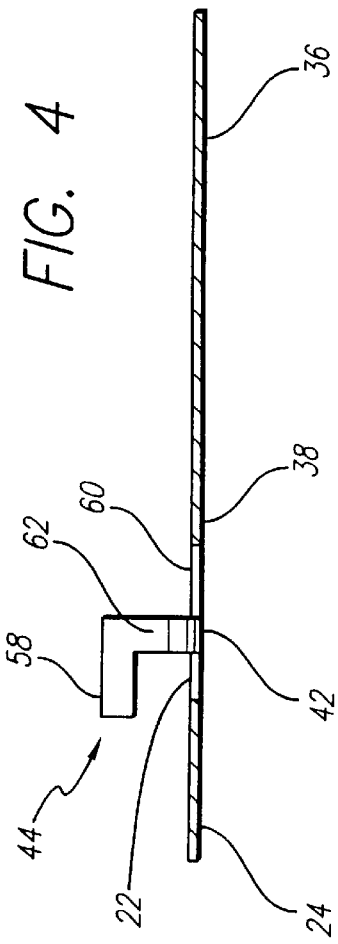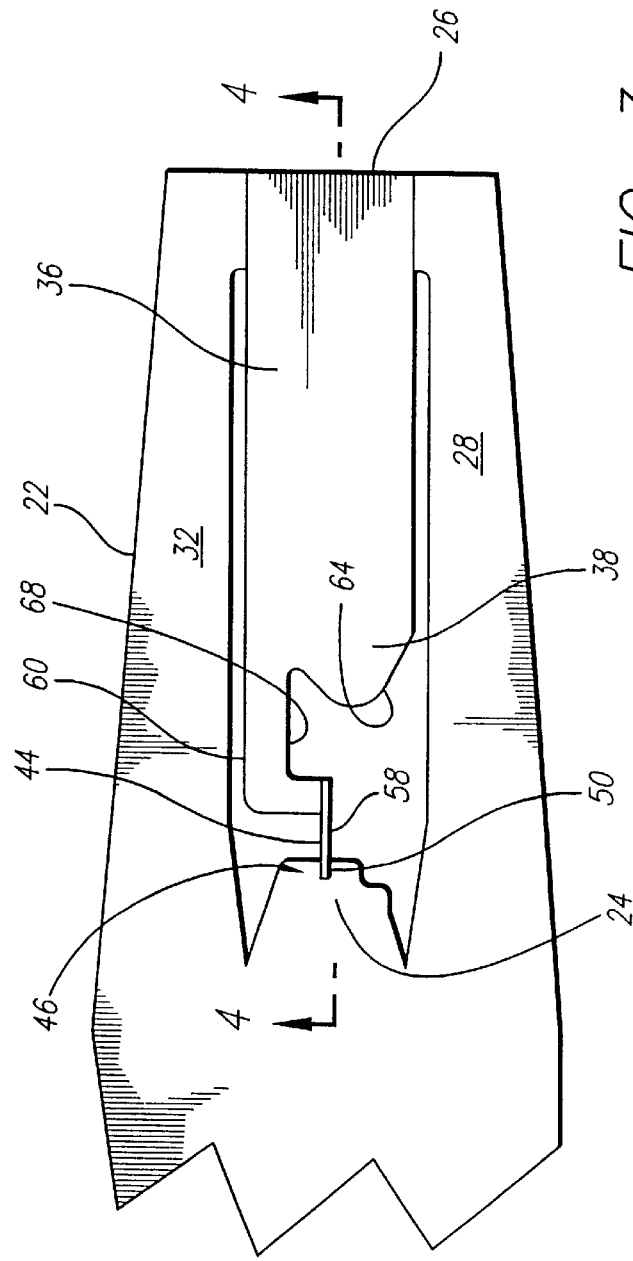

METHOD OF MAKING A SUSPENSION FLEXURE WITH LOAD-UNLOAD EFFICIENT MOTION LIMITING FEATURE

REFERENCE TO RELATED APPLICATION

This application claims the benefit of U.S. Provisional Application Ser. No. 60/079,300, filed Mar. 25, 1998 and futher claims the benefit of U.S. patent application Ser. No. 09/274,755, filed Mar. 23, 1999, now U.S. Pat. No. 6,137,657, issued Oct. 24, 2000.

BACKGROUND OF THE INVENTION

1. Field of the Invention

This invention relates to disk drive suspensions, and more particularly to improvements in limiter-featured disk drive suspensions comprising a load beam and attached thereto a flexure comprising a flexure frame and a flexure tongue adapted to carry a slider for increased load-unload efficiency. The invention provides an improved form of limiter structure to that blocks undue movement of the flexure tongue relative to the flexure frame by engaging the tongue free end with the frame in response to an undue excursion of the tongue. The tongue free end-flexure frame contact is localized to a single locus on the tongue free end. This locus is centrally located to avoid possible tipping of the tongue that can occur when outboard limiter structures at the edges of the tongue free end are employed owing to a possible difference in time of engagement. Non-simultaneous engaging contact of the limiters can tip the slider by first raising only one side of the tongue. This does not occur in this invention, since the limiter engagement locus is centrally located and unitary and thus incapable of not being uniform in time of engagement.

2. Related Art

Limiter structures are broadly known. They are generally designed to either prevent excessive excursions during shock events such as the jarring or dropping of the computer, or to prevent damage to the suspension during loading and unloading cycles. These two situations have different requirements. In load-unload, the slider is lifted from the disk against the forces holding it in position including spring loading by the suspension and the vacuum developed between the slider and the rotating disk. Load-unload cycles in present computers occur frequently, particularly in laptop computers, in an effort to conserve power and thus prolong battery life.

It has been suggested to limit flexure tongue travel with slot and tab arrangements with the tab interfitting the slot, the tab extending typically from the load beam and the slot in the tongue, or vice-versa, with fold-over tabs extending from the load beam and embracing the flexure so as to limit the flexure tongue travel, and with expandable ribbons linking the tongue free end with the opposing frame, or attached to the load beam, but these expedients are more complex to satisfactorily manufacture and may be too costly.

SUMMARY OF THE INVENTION

The repeating load-unload cycles of lifting and replacing the slider at the disk should not be a source of potential failure of the drive. Nonetheless, inadequate design in the lifter may cause failures. In U.S. Pat. No. 5,771,136, for example, a lifter is disclosed that has left and right sides intended to engage the flexure tongue at both its left and right edges with the opposing frame surfaces. Apparently intended primarily for shock situations, the disclosed lifter in an unloading situation must necessarily engage both left and right tongue edges simultaneously or risk tipping the tongue and thus the slider. Given the close proximity of the slider to the disk, tipping from non-simultaneous, and thus uneven engagement, is to be avoided. Manufacturing tolerances are unlikely to be capable of being held so tight, and manufacturing operations unlikely of being kept so free of mishandling that even a perfect design for simultaneous engagement is not proof against mishaps.

The present invention provides a single contact lifter that is incapable of separated-in-time contact by different parts of the lifter structure, that is thus highly suited to load-unload cycling, and which, in reducing failures, is more efficient as a lifter.

The invention, in particular, provides a disk drive suspension assembly of a flexure and a flexure support, the flexure having a tongue adapted to carry in gimbaling relation a slider in operating proximity to a disk, the flexure support and the flexure tongue defining cooperating structures inboard of the tongue edges, and preferably located within the middle third of the tongue free end width, which limit motion of the tongue relative to the disk to a predetermined range.

In preferred embodiments the cooperating structures comprise a relatively movable structure, such as a hook carried by the tongue and a relatively fixed structure such as the flexure frame surrounding the tongue. The specific form of the cooperating structures is not narrowly critical provided the motion of the tongue free end is restricted past a predetermined point and by a single structure of a single or double or divided wall located centrally of the flexure tongue free end.

More particularly, the invention provides a load-unload efficient disk drive suspension comprising a load beam having a base portion, a spring portion and a rigid portion, and a flexure secured to the load beam rigid portion, the flexure comprising a frame and a generally planar tongue cantilevered from the frame to have a free end spaced from the frame, a limiter structure limiting the relative movement of the flexure tongue and the flexure frame to a predetermined range, the limiter structure comprising a centrally located portion of the tongue free end bent to extend out of the plane of the tongue and shaped to extend beyond the tongue free end to intersect with the flexure frame to limit tongue movement relative to the frame to within the predetermined range.

In this and like embodiments, typically, the flexure tongue free end has an outermost tip, the tip being locally deflected to a plane generally normal to the tongue plane, the tongue free end centrally located portion lies within the central one-third of the lateral width of the tongue free end, or is centered on the tongue free end longitudinal axis of revolution.

In a further embodiment, typically, there is provided a load-unload efficient disk drive suspension comprising a load beam having a base portion, a spring portion and a rigid portion, and a flexure secured to the load beam rigid portion, the flexure comprising a frame and a generally planar tongue cantilevered from the frame to have a free end spaced from the frame, the flexure frame comprising first and second transverse portions and left and right side longitudinally disposed outriggers connected together to define a surrounded opening, the tongue extending into the surrounded opening in cantilevered relation, a limiter structure limiting the relative movement of the flexure tongue and the flexure frame to a predetermined range, the limiter structure comprising a centrally located portion of the tongue free end shaped to extend beyond the tongue free end to intersect with the flexure frame to limit tongue movement relative to the frame to within the predetermined range.

In a further embodiment the invention provides a load-unload efficient disk drive suspension comprising a load beam and a flexure having a tongue with a free end forming a limiter structure, including defining a cut along a transverse line inward of the tongue free end from a first edge of the tongue free end partway across the free end to the centrally located portion of the free end to free a flap of material from the tongue free end and leave an uncut remainder to the second edge of the tongue free end, defining the flap to have a head including the tongue free end first edge and a neck of reduced extent relative to the head such that the flap is hook-shaped and its head portion extends beyond the tongue free end remainder, and bending the flap into a substantially normal orientation relative to the tongue free end to have the head overlie the flexure frame transverse portion opposite the tongue free end in spaced relation corresponding to the predetermined range.

In this and like embodiments, typically, the first and second edges of the tongue free end are spaced laterally of the tongue free end central portion and free of limiter structure, the tongue free end centrally located portion lies within the central one-third of the width of the tongue free end, and the centrally located portion is centered on the tongue free end longitudinal axis of revolution.

In its method aspects, the invention includes the method of forming a limiter structure on a load-unload efficient disk drive suspension comprising a load beam and a flexure, the flexure comprising a frame and a tongue cantilevered from the frame and having a free end, the method including defining a cut along a transverse line inward of the tongue free end from a first edge of the tongue free end partway across the free end to the centrally located portion of the free end to free a flap of material from the tongue free end and leave an uncut remainder to the second edge of the tongue free end, the flap having a head including the tongue free end first edge and a neck of reduced extent relative to the head such that the flap is hook-shaped and its head portion extends beyond the tongue free end uncut remainder, and bending the flap into a substantially normal orientation relative to the tongue free end, whereby the head overlies a the frame transverse portion opposite the tongue free end in spaced relation corresponding to the predetermined range.

THE DRAWINGS

The invention will be further described in conjunction with the attached drawings in which:

FIG. 3 is a plan view of the invention flexure; and,

FIG. 4 is a view taken on line 4—4 in FIG. 3.

DETAILED DESCRIPTION

Figure 1:
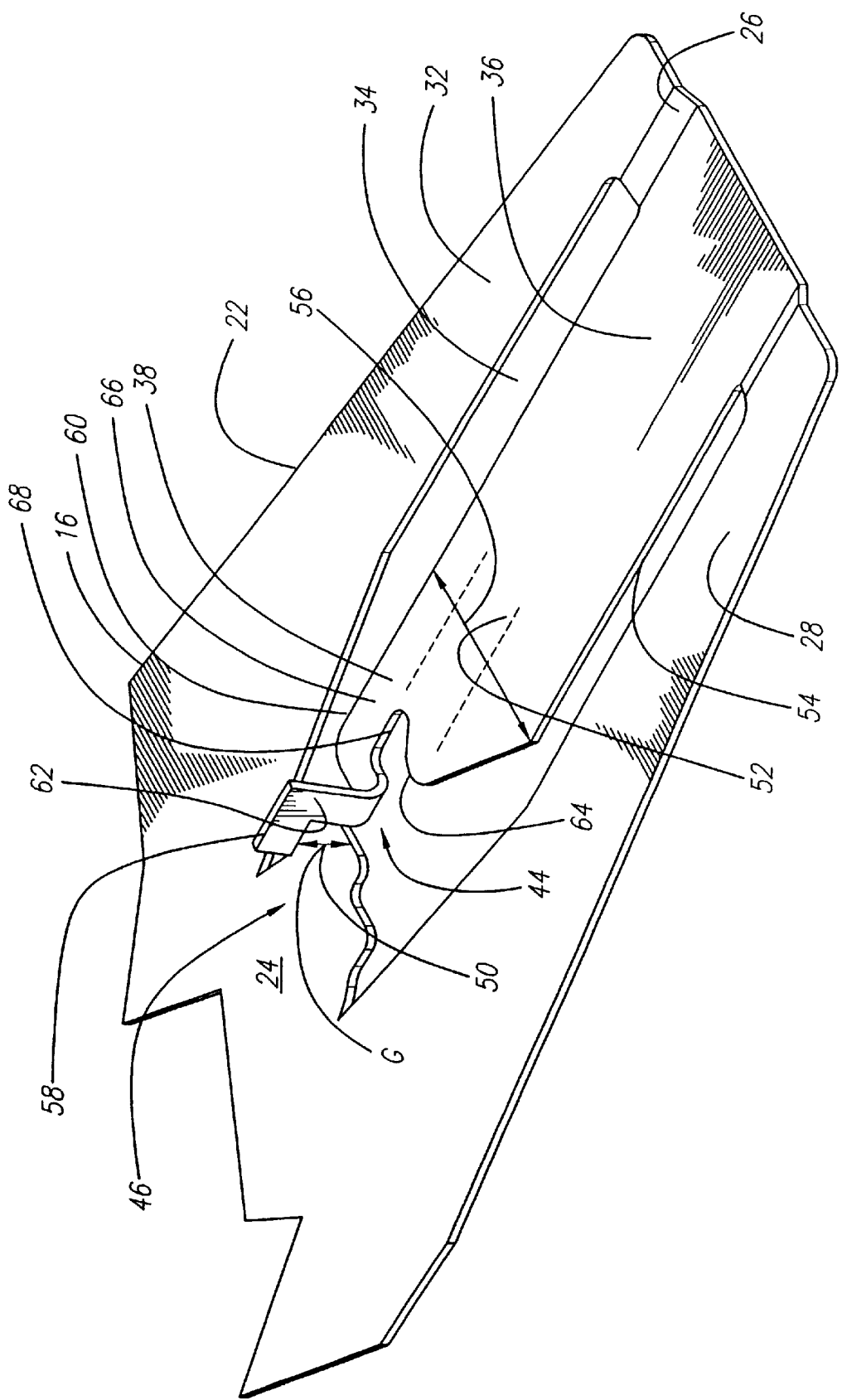
FIG. 1 is an oblique view of a limiter structure-featured flexure according to the invention.

The invention uses the flexure, the flexure tongue, the flexure outriggers and other structure in the vicinity of the flexure tongue to define cooperating structure which interacts with the tongue cooperating structure to limit range of the motion of the tongue to facilitate unloading, to avoid lift-off from the dimple in some cases, and to limit movement relative to, e.g. toward and/or away from the disk drive disk, so as to maintain a gimbaling capability over a predetermined range of movement, limited by a limiter that prevents or reduces movement beyond that range.

It will be noted that the central location of the limiter structure and the absence of limiter structure at the edges of the tongue free end enables the invention to uniformly limit the tongue in an unload situation and not possibly rock the tongue and its slider as can happen with dual contact limiters.

With reference now to the Figures, in FIGS. 1–4 the invention comprises a load-unload efficient disk drive suspension 10 comprising a load beam rigid portion 12 having edge rails 14, and a flexure 16 carrying a slider 18. The flexure 16 is secured to the load beam rigid portion 12, and comprises a frame 22 having a proximate first transverse portion 24, a distal second transverse portion 26, left and right frame members 28, 32 linked to the transverse portions to define the frame surrounding an open space 34. Flexure 16 further comprises a generally planar tongue 36 cantilevered from the frame distal transverse portion 26 to project into the space 34 within the frame 22. Tongue 36, typically formed from the same resilient stainless steel material as the frame 22, has a free end 38 spaced from the surrounding frame portions 24, 26 and frame members 28, 32.

Figure 2:
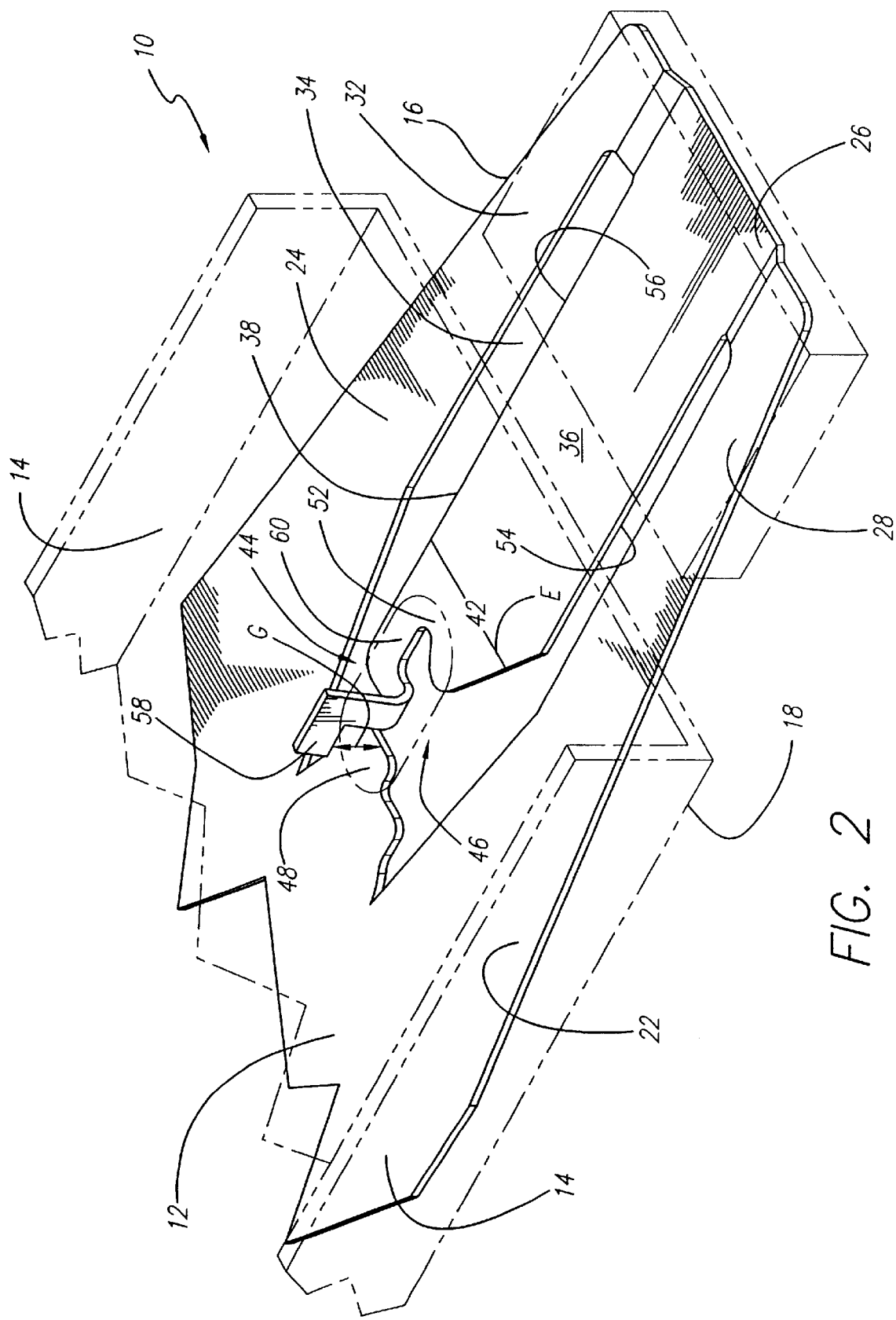
FIG. 2 is an oblique view of the invention flexure fixed to a load beam and carrying a slider.

The tongue free end 38 terminates in a tip 42 defined by a final reduction in the tongue free end width and a configuring therefrom of the movable part 44 of the limiter structure 46 in a manner to intersect with the stationary part 48 of the limiter structure opposite the tongue free end 38 and defined by the proximate first transverse portion 24 of the frame 22. Limiter structure 46 limits the relative movement of the flexure tongue free end 38 and the flexure frame 22 to a predetermined range equal to the gap G (FIG. 2) between the limiter structure movable part 44 and its (relatively) stationary part 48. The limiter structure 46 is formed at a centrally located portion 52 of the tongue free end 38, that is inboard of the tongue free end left- and right-hand edges 54, 56, and typically in the middle or central one-third of the lateral extent E (FIG. 2) of the tongue free end 38. In FIG. 2 of the drawings the limiter structure 46 is shown centered on the tongue free end 38 longitudinal axis of revolution L., but it can be located to either side of this axis as long as the location is within the middle third of the tongue free end 38 width or lateral extent E.

Moving part 44 comprises the free end tip 42 cut into a flap 60 and locally deflected or bent to extend out of the predominant horizontal plane of the tongue 36 and generally normal thereto. The movable part 44 is shaped as shown to be hook-like with a relatively greater dimensioned head 58 and a reduced dimension neck 62 such that the head extends beyond the tongue free end 38 to intersect with the flexure frame first transverse portion 24 at locus 50 (FIG. 1), thereby to limit tongue 36 movement relative to the frame 22. The head 58 is shown as a single panel, but may comprise multiple panels for added breadth of contact, all to be within the central portion 52 (FIG. 1) of the tongue free end 38.

With particular reference to FIGS. 3 and 4, the limiter structure movable part 44 is defined from the tongue free end tip 42 by making a cut 64, by etching or otherwise, transversely of the tip and inward of the tongue free end 38 from, e.g., the left-hand edge 54 of the tongue free end 38 partway across the free end to the centrally located portion 52 of the free end to free the flap 60 of material from the tongue free end and leave an uncut remainder 66 to the second or right-hand edge 56 of the tongue free end. Flap 60 is further cut at 68 to define the head 58, including the tongue free end right-hand edge 56 and the neck 62 of reduced transverse extent relative to the head such that the flap is hook-shaped and its head 58 extends beyond the tongue free end remainder 66. The flap 60 is bent into a substantially normal orientation e.g. 90°+/−10–15° relative to the tongue free end 38 to have the head 58 overlie the flexure frame transverse portion 24 opposite the tongue free end in spaced relation across gap G corresponding to the predetermined range that will limit undue travel of the tongue free end 38 during load-unload operations.

In an unload situation, a lifter shifts the load beam and flexure from the disk. Frequently the disk is spinning still and the slider must be forcibly lifted. The invention limiter enables the flexure tongue to lift the slider from the disk against the existing contrary forces while preventing overbending of the tongue and damage to the suspension. The single, central contact of the limiter 46 on the flexure frame 22 blocks rocking of the tongue 36 and flexure 16 that might otherwise occur as in dual limiter constructions, with possible contact of the resultantly tipped slider with the spinning disk. The present invention flexure and limiter is thus more efficient than the prior art.

The foregoing objects are thus met.

We claim:

1. The method of forming a limiter structure on a load-unload efficient disk drive suspension comprising a load beam and a flexure, said flexure comprising a frame and a tongue cantilevered from said frame and having a free end, said method including defining a cut along a transverse line inward of said tongue free end from a first edge of said tongue free end partway across said free end to the centrally located portion of said free end to free a flap of material from said tongue free end and leave an uncut remainder to the second edge of said tongue free end, said flap having a head including said tongue free end first edge and a neck of reduced extent relative to said head such that said flap is hook-shaped and its head portion extends beyond said tongue free end uncut remainder, and bending said flap into a substantially normal orientation relative to said tongue free end, whereby said head overlies a said frame transverse portion opposite said tongue free end in spaced relation corresponding to said predetermined range.

* * * * *

UNITED STATES PATENT AND TRADEMARK OFFICE
CERTIFICATE OF CORRECTION

PATENT NO.    : 6,367,145 B1
DATED         : April 9, 2002
INVENTOR(S)   : Coon, Khan, Nuno, Wolf and Summers It is certified that error appears in the above-identified patent and that said Letters Patent is hereby corrected as shown below:

<u>Title page,</u>
Item [75], Inventors, should read as follows: -- Warren Coon; Amanullah Khan; Gustavo Nuno; David Wolf; Robert Summers, all of Temecula, CA (US) --

Signed and Sealed this

Twenty-fourth Day of September, 2002

*Attest:*

JAMES E. ROGAN
*Attesting Officer*          *Director of the United States Patent and Trademark Office*